United States Patent
Casey et al.

(10) Patent No.: US 7,783,750 B1
(45) Date of Patent: Aug. 24, 2010

(54) SYSTEM AND METHOD FOR EXTERNALIZED REAL-TIME LOG CORRELATION AND PERFORMANCE MONITORING OF SERVICE-ORIENTED APPLICATIONS

(75) Inventors: William L. Casey, Flower Mound, TX (US); Michael J. Luedecke, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 11/881,870

(22) Filed: Jul. 30, 2007

(51) Int. Cl.
*G06F 15/16* (2006.01)
(52) U.S. Cl. ....................................... 709/224
(58) Field of Classification Search ............... 709/224
See application file for complete search history.

(56) References Cited

U.S. PATENT DOCUMENTS

| | | | |
|---|---|---|---|
| 5,539,884 A * | 7/1996 | Robrock, II | 709/227 |
| 5,870,454 A * | 2/1999 | Dahlen | 379/88.14 |
| 6,041,115 A * | 3/2000 | Jellema et al. | 379/230 |
| 6,570,978 B1 * | 5/2003 | Johnsen et al. | 379/221.08 |
| 2003/0056200 A1 * | 3/2003 | Li et al. | 717/128 |
| 2003/0208533 A1 | 11/2003 | Farguharson et al. | |
| 2004/0103195 A1 | 5/2004 | Chalasani et al. | |
| 2005/0283528 A1 | 12/2005 | Rosu et al. | |
| 2006/0064483 A1 | 3/2006 | Patel | |
| 2007/0220492 A1 * | 9/2007 | Brugiolo et al. | 717/126 |

OTHER PUBLICATIONS

U.S. Patent Application entitled "Evaluating Performance of Software Application" (29 pages) and four (4) sheets drawings, filed May 23, 2006.

* cited by examiner

*Primary Examiner*—Wing F Chan
*Assistant Examiner*—Tesfay Yohannes

(57) ABSTRACT

A method for service call data logging, including intercepting a call to a data processing service; generating first log data corresponding to the call; transmitting a request message to the data processing service, the request message including the first log data and the call; intercepting a response message corresponding to the request message, the response message including a service response to the call and second log data corresponding to the first log data and including log information corresponding to processing of the call; generating third log data corresponding to the first log data and the second log data; and storing the third log data.

13 Claims, 3 Drawing Sheets

SYSTEM AND METHOD FOR EXTERNALIZED REAL-TIME LOG CORRELATION AND PERFORMANCE MONITORING OF SERVICE-ORIENTED APPLICATIONS

TECHNICAL FIELD

The present disclosure is directed, in general, to systems and methods for monitoring data processing systems and applications.

BACKGROUND OF THE DISCLOSURE

Performance monitoring, in general, refers to knowing whether a data processing system application is responding within desired timing parameters, whether executing locally or remotely. For example, it may be help full to examine whether web pages displayed quickly or if a web service responding as expected.

Usage monitoring generally refers to capturing metrics as to who is using an application or service, or who is using specific pieces of functionality of an application or service.

There is a need in the art for improved systems and methods for monitoring data processing systems and applications.

SUMMARY OF THE DISCLOSURE

According to one disclosed embodiment, there is a method for service call data logging. The method includes intercepting a call to a data processing service and generating first log data corresponding to the call. The method also includes transmitting a request message to the data processing service, the request message including the first log data and the call and intercepting a response message corresponding to the request message, the response message including a service response to the call and second log data corresponding to the first log data and including log information corresponding to processing of the call. The method also includes generating third log data corresponding to the first log data and the second log data and storing the third log data.

According to another disclosed embodiment, there is a method for service call data logging. The method includes intercepting a request message for a data processing service, the request message including first log data and a call to the data processing service and generating second log data corresponding to the first log data. The method also includes delivering the call to the data processing service and intercepting a service response corresponding to the call from the data processing service. The method also includes generating third log data corresponding to the second log data and including log information corresponding to processing of the call. The method also includes transmitting a response message corresponding to the request message, the response message including the service response and the third log data, and storing the third log data.

According to another disclosed embodiment, there is a method for service call data logging. The method includes intercepting a call from a first data processing service to a second data processing service and generating first log data corresponding to the intercepted call. The method also includes transmitting a request message to the second data processing service, the request message including the first log data and the intercepted call and intercepting the request message. The method also includes generating second log data corresponding to the request message and delivering the call to the second data processing service. The method also includes intercepting a service response corresponding to the call from the second data processing service and generating third log data corresponding to the second log data and including log information corresponding to processing of the call. The method also includes transmitting a response message to the first data processing service corresponding to the request message, the response message including the service response and the third log data, and storing the third log data.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
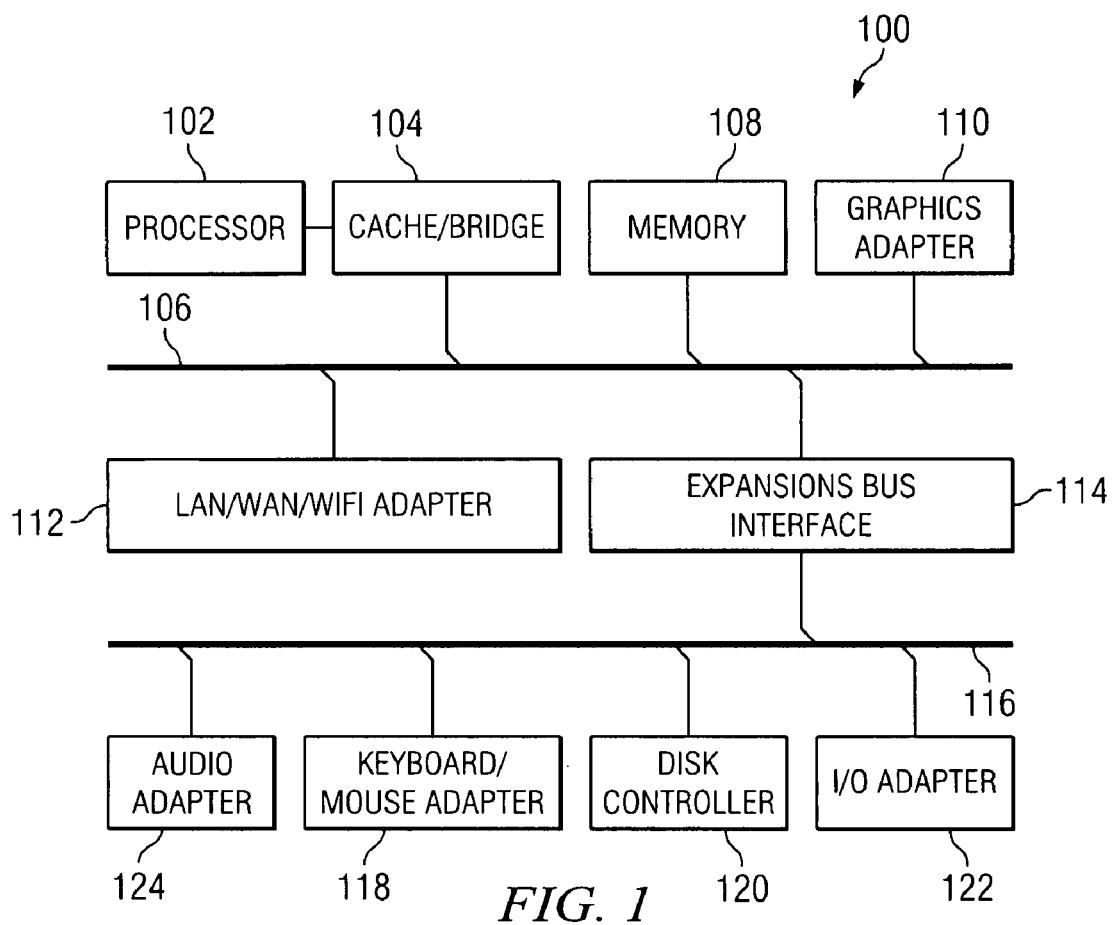
FIG. 1 depicts a block diagram of a data processing system 100 in which an embodiment can be implemented.

FIG. 1 depicts a block diagram of a data processing system 100 in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Data processing system 100 can be used in various disclosed embodiments as a stand-alone data processing system or in a network of other data processing systems.

Figure 2:
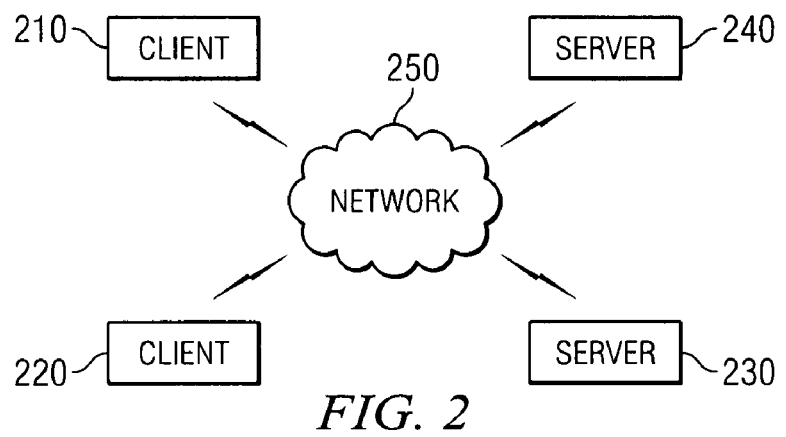
FIG. 2 depicts a block diagram of a data processing network in which a disclosed embodiment can be implemented.

FIG. 2 depicts a block diagram of a data processing network in which a disclosed embodiment can be implemented. Here, client data processing systems 210 and 220, and server data processing systems 230 and 240 can communicate with each other via network 250. Client data processing systems 210 and 220, and server data processing systems 230 and 240 can be implemented as data processing system 100, or using other technology known to those of skill in the art, configured and programmed to function as described herein. Network 250 can be a single public or private network, including the Internet, or can be a combination of multiple networks and networking devices, as known to those of skill in the art.

Various disclosed embodiments enable and improve the process of monitoring both performance and usage of software applications and services.

Some configurable timer logger and evaluation module capabilities discussed herein, referenced as the "Application Monitor", are discussed in more detail in copending, commonly assigned application Ser. No. 11/439,457, filed May 23, 2006, which is hereby incorporated by reference. The Application Monitor is a reusable and configurable mechanism which is used to instrument application code in specific locations, including application boundary methods and calls to external mechanisms such as database calls or web service calls. One feature is that the Application Monitor, based on externalized configuration settings, conditionally produces log messages that can indicate the start and end of execution which is useful for developer debugging, whether the execution duration exceeded pre-defined thresholds that are indicative of warning and error levels of application performance, and usage of the application, or sub-component of it, including information such as who is the user or calling application, and the calculated internal response time.

The output of the Application Monitor can be automatically routed to appropriate destinations such as support staff and corporate data warehouses. In this way, for performance issues, the support staff can receive an immediate and near real-time notification that there is an issue Current implementations of the Application Monitor are achieved by making calls directly to it from application code. A significant advantage of the present disclosure is the ability to eliminate or minimize the need to modify application code to implement monitoring. While the Application Monitor can be used directly in application code, it is advantageous to monitor all incoming calls to an application, and all outgoing calls from an application to other services, without having to modify the code of the applications or web services to be monitored.

Various disclosed embodiments also provide automatic and real-time correlation of logs across all layers/services of an application. For any pass through the application (for example, any press of the Enter key) the disclosed embodiments can easily identify all logs that were produced from all layers/services of the application. Currently logs are maintained in isolation for each web service or application. Each may produce logs, but it is not known which logs are related to each other for a given press of the Enter key, nor is it easily known which logs from each application/service are related to a common error, who the end user was, what user interface or web page was running, etc.

Various disclosed embodiments also provide automatic monitoring with real time notification and root-cause determination. If an application or service experiences unacceptable response times then support staff(s) can be automatically notified, using techniques similar to those discussed with regard to the Application Monitor.

Using systems in accordance with disclosed embodiments, it is easy for a user to determine which layer of the application/service is responsible for any performance issues. For example when performance issues or errors are encountered in an application, the system can determine whether the application is at fault or a service that is called by the application.

Network latency can be included when timing calls to a service. If a call to a service is responsible for slow response times, the system can identify not only which service, but also whether the slow response is due to network latency, the service being called, or both.

Various disclosed embodiments include a Message Interceptor that monitors and manipulates communications going to and from applications and services. One disclosed implementation works by intercepting Simple Object Access Protocol (SOAP) messages that flow to and from Web Services, but the concepts discussed herein can be applied to other protocols as well, within the scope of the disclosed and claimed embodiments. In the Java® language, the interceptors are referred to as "Soap Handlers," and in the Microsoft .Net® processing environment they are referred to as "Soap Extensions."

According to various disclosed embodiments, the Message Interceptor executables can be simply placed in the execution folder along with the target application's executables. Where necessary, changes are made to the configuration files for the web service or application but no changes to the code of the web service or application are necessary. These configuration settings instruct the SOAP Engine (or corresponding element in other implementations) to run the Message Interceptor for every incoming and outgoing SOAP message. Configuration files can also be added to the executable folder to control how the Application Monitor behaves for each message. For example whether "usage" logs are created, and thresholds are specified that if exceeded result in "warning" or "error" logs. Once these steps have been followed all incoming and outgoing calls are automatically monitored, and if poor performance is detected then logs are automatically produced and support personnel notified.

As described herein, an "application" or "service" can be spread across numerous machines and devices and can also call other services. The application or service runtime environment is inclusive of the application and service and the Interceptor elements as described herein.

Figure 3:
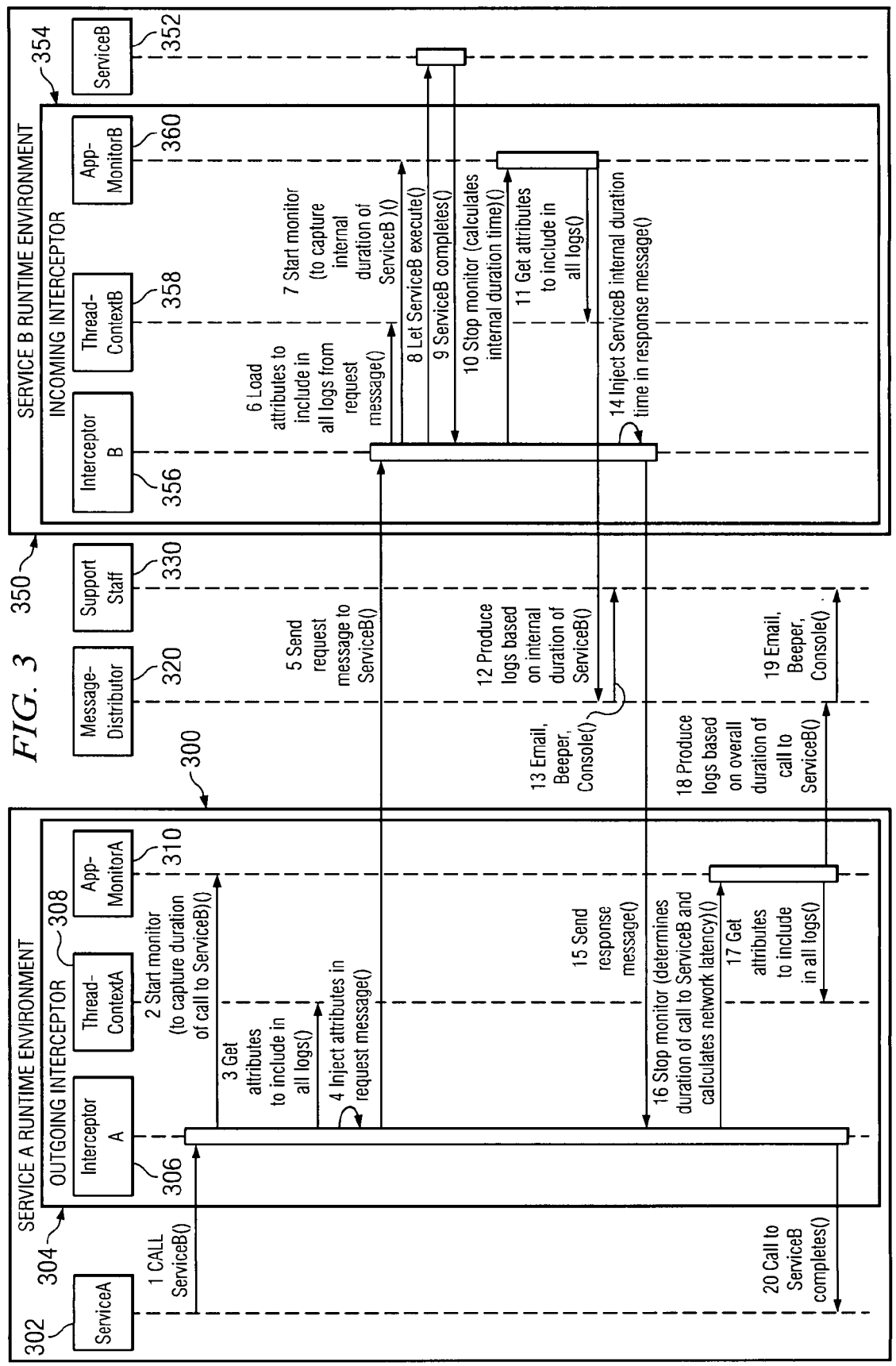
FIG. 3 illustrates message interactions in accordance with a disclosed embodiment.

FIG. 3 illustrates the message interactions, in accordance with a disclosed embodiment, when ServiceA 302, in Service A Runtime Environment 300, makes a call to ServiceB 352, in Service B Runtime Environment 350. The services/applications are completely unaware of the existence of the interceptors and unaware of the processing that occurs in the Message Interceptor boxes 304/354. As far as ServiceA 302 is concerned, it is making a call directly to ServiceB 352. In this example, then, Interceptor A 306 is the "outgoing interceptor", and Interceptor B 356 is the "incoming interceptor".

In a typical implementation, ServiceA 302 and ServiceB 352 operate on separate data processing systems or combinations of systems, and communicate across a network. For example, ServiceA 302 can operate on server 230 and ServiceB 352 can operate on server 240, communicating over network 250, and each of these servers can be implemented as a data processing system 100. In other embodiments, one or another service and runtime environment can operate across multiple data processing systems or devices. In other embodiments, multiple services can operate on a common data processing system, and so communications would not necessarily be via network, but directly between service functions or application. The generated logs or log data can, in some embodiments, be transmitted over a network and stored on yet another data processing system.

Note that, while omitted from FIG. 3 for clarity and simplicity, the Incoming and Outgoing Interceptor logic happens for each service. For example if Service B makes a call to a Service C, then the Outgoing Message Interceptor logic would run for Service B. And if another service calls Service A, then the Incoming Message Interceptor logic will run for Service A. Both the Outgoing and Incoming Message Interceptor logic can apply and run for each individual service. In various embodiments, there is no limit as to how many levels that the services nest their calls to each other.

In this example, in step 1, ServiceA 302 makes a call to ServiceB 352.

In step 2, Interceptor A 306 receives control before the call is allowed to proceed to ServiceB, whether across a network on in a common data process system. Interceptor A 306 calls the Start method of the Application Monitor A 310 that will time the call being made to ServiceB 352. In some disclosed embodiments, SoapHandlers/SoapExtensions are used to intercept calls between services.

In step 3, Interceptor A 306 pulls values from the Thread Context 308 object. The Thread Context objects maintain a collection of name-value pairs for each logical thread of execution—for example independent values are maintained for each press of the "enter" key. The Thread Context 308 is used to store values that can be included in every log such as a) a globally unique identifier that correlates all logs that are created for this logical thread of execution and b) the user id of the logged-in user. In this manner, real-time and automatic correlation of all logs produced by all layers/services of the application can be performed. The Thread Context 308 object can automatically obtain values from the application/web server such as the UserID of the logged in user, and it can automatically generate a GUID (Globally Unique Identifier) that will be included in every log for each press of the Enter key, for example.

In step 4, all attributes contained in the Thread Context 308 are injected into a request message that is transported across the network (or in a common data processing system) for the call to ServiceB 352 so that these values can be included in any logs produced by ServiceB 352. In some disclosed embodiments, SoapHeaders can be used to inject these extra attributes.

In step 5, Interceptor A 306 relinquishes control and allows the message to now be sent across the network or otherwise toward ServiceB 352.

In step 6, Interceptor B 356 receives control before the message is passed to ServiceB 352. Interceptor B 356 pulls the custom attributes (globally unique identifier, user id) from the message and puts them in a Logger Context object (not shown) as part of Thread Context B 358 that resides with Service B 352. These values are now accessible to all code running on this logical thread of execution.

In step 7, Interceptor B 356 calls the Start method of the Application Monitor B 360 that can time the internal execution duration of ServiceB 352.

In step 8, Interceptor B 356 relinquishes control which allows ServiceB 352 to execute.

In step 9, ServiceB 352 completes and control is again given to Interceptor B 356.

In step 10, Interceptor B 356 calls the Stop method of the Application Monitor B 360 which a) calculates the internal execution duration of ServiceB 352 and b) determines whether any logs need to be generated base on the duration and settings in its configuration file.

In step 11, assuming logs need to be generated, attributes to include in all logs are obtained by the Thread Context B 358 object.

In step 12, logs are generated, and transmitted to Message Distributor 320.

In step 13, support staff 330 are notified by Message Distributor 320 if the logs indicate any problem conditions such as slow response times.

In step 14, Interceptor B 356 injects the internal execution duration of ServiceB 352 into the response message that will be sent back across the network to ServiceA 302.

In step 15, the response message is sent back to ServiceA 302. As above, however, Interceptor A 306 automatically receives control before control is actually given back to ServiceA 302.

In step 16, Interceptor A 302 calls the Stop method of the Application Monitor A 310 which a) calculates the amount of time it took to call ServiceB 302, b) calculates network latency (how much time was network related versus time ServiceB 302 took executing) by subtracting the internal duration of ServiceB 302 from the overall call duration and c) determines whether any logs need to be generated base on the overall duration and settings in its configuration file.

In step 17, assuming logs need to be generated, attributes to include in all logs are obtained by the ThreadContext A 308 object.

In step 18, logs are generated, and transmitted to Message Distributor 320.

In step 19, support staff are notified by Message Distributor 320 if the logs indicate any problem conditions such as slow response times.

In step 20, Interceptor A 306 relinquishes control which allows the call from ServiceA 302 to ServiceB 352 to now complete.

The process can be regarded from the "perspective" of the Outgoing Interceptor 304. During this process, when an application/service ServiceA 302 makes a SOAP call, the Outgoing Interceptor 304 is configured to execute before the SOAP Request is transmitted across the network. A Request Handler of Interceptor A 306 will get values from the Logger Context of Thread Context A 308 (UserID, GUID, WebPageName, etc.), and put these values into the Request Headers so that they will be transported and available to the called ServiceB 352. This can be considered first log data corresponding to the call.

Interceptor A 306 interrogates the SOAP Request to determine the Method Name of the service being called, calls the Start method of the Application Monitor A 310, and passes the Method Name in as a parameter. This allows the Application Monitor A 310 to look up configuration settings and determine what type of monitoring to perform.

ServiceB 352 is called, including the first log data (intercepted by Interceptor B 356 as described above), and will return a response include Response Headers.

Request Handler of Interceptor A 306 will interrogate the Response Headers to determine if the ServiceB 352 has given included its Internal Response Time, as produced by Interceptor B 356. In this way, the response message including a service response to the call and second log data corresponding to the first log data and including log information corresponding to processing of the call.

Interceptor A 306 calls the Stop method of the Application Monitor A 310 and pass in the Internal Response Time if it was found. The Application Monitor A 310 can now compare the response time to thresholds and produce any necessary logs, which can be third log data, which can then be stored. Control is then returned to the calling application/service ServiceA 302.

The process can also be regarded from the "perspective" of the Incoming Interceptor 354. When an application or service makes a SOAP call to the Service the Incoming Interceptor 354 will be configured to execute before the call is actually made to the called service, in this case ServiceB 352. Interceptor therefore intercepts a request message for a data processing service ServiceB 352, and the request message includes "first log data" from the Request Header and the call to ServiceB 352.

A Response Handler of Interceptor B 356 gets values from the Request Headers if they are present. (UserID, GUID, WebPageName, etc.), and puts these values into the Logger Context of ThreadContext B 358 so that they are available to any code running on this logical thread of execution. In this way, second log data corresponding to the first log data is generated.

Interceptor B 356 interrogates the SOAP Request to determine the Method Name of the service being called.

Interceptor B 356 calls the Start method of the Application Monitor B 360 and passes the Method Name in as a parameter. This allows the Application Monitor B 360 to look up configuration settings and determine what type of monitoring to perform.

ServiceB 352 is called. Interceptor B 356 intercepts the a service response corresponding to the call.

The Response Handler of Interceptor B 356 calls the Stop method of the Application Monitor B 360 and gets from it the calculated Internal Response Time of the service. Application Monitor B 360 will compare the response time to thresholds and produce any necessary logs.) In this way, Interceptor B 356 creates third log data corresponding to the second log data and including log information corresponding to processing of the call.

Interceptor B 356 places the Internal Response Time in the Response Headers so that this value will be transported to the calling application. The SOAP message, including the service response and the third log data, is then transported to the calling application/service ServiceA 302.

Figure 4:
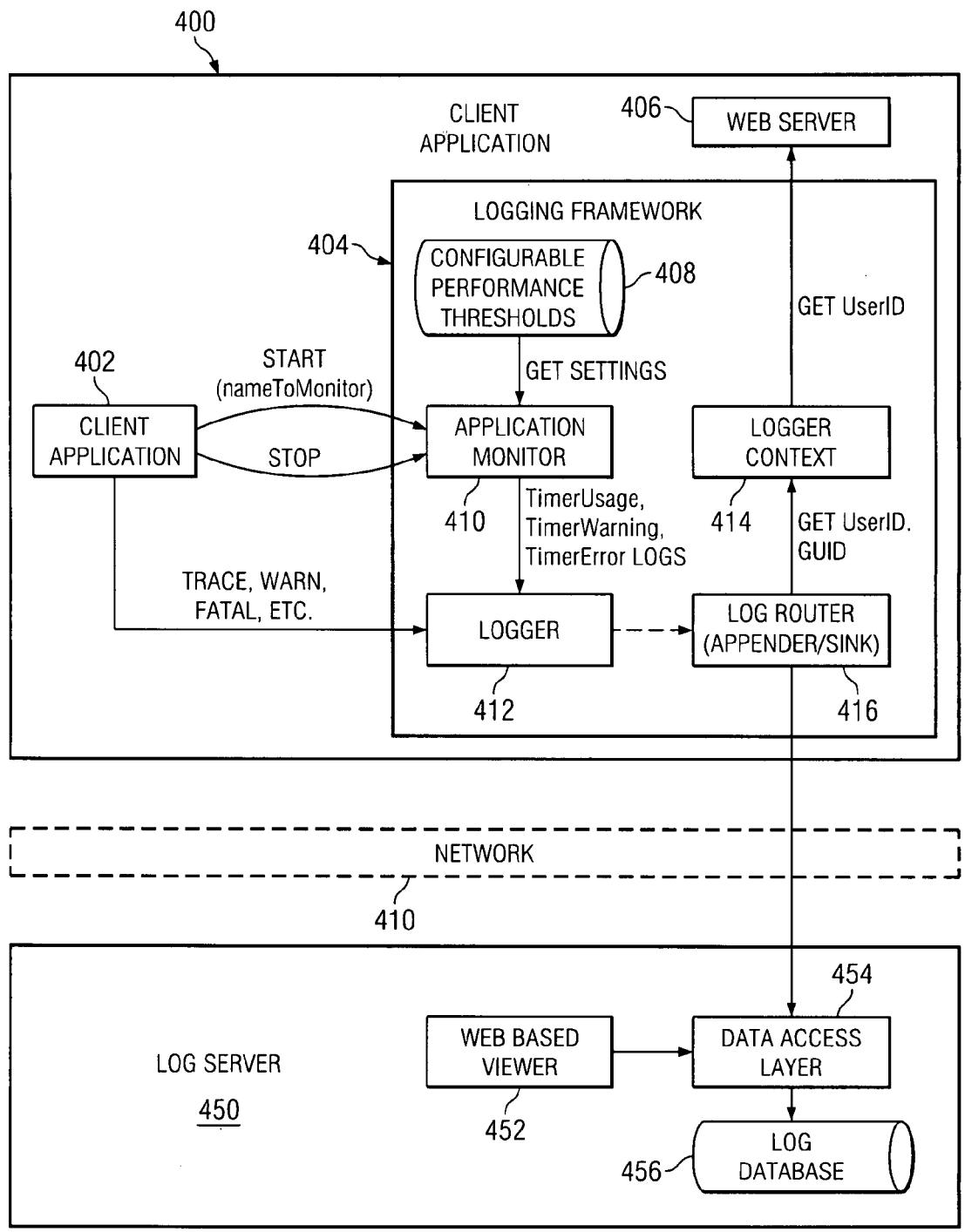
FIG. 4 depicts a block diagram of a monitoring framework in accordance with various disclosed embodiments.

FIG. 4 depicts a block diagram of a monitoring framework in accordance with various disclosed embodiments, between a client application environment 400 and an Log Server environment 450.

Client applications 402 can make direct calls to the Application Monitor 410 and Logger 412 components for logging and monitoring purposes. Applications 402 also make calls to the Logger 412 for debugging and error reporting. These are part of logging framework 404.

The Logger 412 includes a class that has methods for producing various types of logs. For Microsoft .Net® implementations, this can be a class maintained that wraps the Microsoft® Enterprise Library Logging Block. For Java° implementations, this class can be in the Jakarta Commons Logging or Log4j framework.

Application Monitor 410 includes a class that can be used for performance monitoring and has two primary methods. "Start" is called to begin timing something, and "Stop" is called when the item being timed has completed. Application Monitor 410 will then compare the calculated duration against configurable thresholds (for the name of the item being monitored) and produce a warning or error log if thresholds were exceeded. Application Monitor 410 can also be configured to produce a Usage log for each call to the item.

Logger Context 414 includes a class that maintains a collection of name-value pairs for each logical thread of execution (for example each press of the enter key). There are four values that we are primarily interested in from a logging and monitoring perspective, however, applications can include additional values that they deem as important:

GUID. (Globally Unique Identifier) The Logger Context 414 will generate a new GUID for each logical thread of execution (for example press of the enter key). All logs that shared the same GUID were produced on a single logic thread of execution.

UserID of the end user. The Logger Context 414 can be configured to automatically retrieve this value from the application/web server 406.

Webpage—the name of the executing web page. The Logger Context 414 will automatically detect if it is running in a web environment and retrieve the name of the executing web page.

Company Identifier—identifies the company whose data was being processed that resulted in logs getting created These values, along with any additional values included by the application, are preferably included in every log produced on the same logical thread of execution so that there is real-time correlation of logs. A log viewer can sort and filter on these values aiding in diagnostics and trouble shooting.

Log Router 416 can include logging frameworks such as Log4j framework and the Microsoft® EntLib framework that can be extended with custom routers that control how logs are formatted and where they are stored. A custom router is used to retrieve the UserID, Webpage, and GUID values from the Logger Context 414 and include them as attributes of each log, and send the logs to a centralized back-end. In the Java® environment, these routers are typically referred to as Appenders, and in the Microsoft .Net® environment, these routers are typically referred to as Sinks.

Log Server environment 450 includes a data access layer 454, a common back-end log database 456 for storing logs, and a web-based viewer 452 that developers can use to locate and view logs. Data access layer 416 can communicate with log router 416, for example over network 410.

In various embodiments, a responsibility of the Request Handler will be to create a "name to monitor" using the following format:

Soap.direction.site.className.methodName

| | |
|---|---|
| Soap. | The first node of the name is always "Soap.". |
| direction | The Outgoing Interceptor Request Handler will always use "Outgoing" for the direction. The Incoming Interceptor Request Handler will always use "Incoming" for the direction. |
| site | The web site value that can be parsed from the URL of the SOAP message. For example if the URL is; http://localhost/TestWebService/Service.asmx Then the site would be "TestWebService". |
| className | The class name that can be parsed from the URL of the SOAP message. For example if the URL is; http://localhost/TestWebService/Service.asmx Then the class name would be "Service". |
| methodName | The method name being called. This can also be obtained from the SOAP message. |

This enables flexibility in how we establish thresholds for monitoring. For example, the following approaches can be used when establishing entries for the ApplicationMonitor:

| | |
|---|---|
| Soap.* | Establishes default settings for all SOAP calls - both incoming to the application and outgoing from the application. |
| Soap.Incoming.* | Establishes default settings for all incoming SOAP calls to the application. |
| Soap.Incoming.className.methodName | Establishes settings for a specific method. |
| Soap.Outgoing.* | Establishes default settings for all outgoing SOAP calls from the application. |
| Soap.Outgoing.site.* | Establishes default settings for all outgoing SOAP calls to a specific site (web server). |
| Soap.Outgoing.site.className.* | Establishes default settings for all outgoing SOAP calls to a specific class on a specific site (web server). |
| Soap.Outgoing.site.className.methodName | Fully qualified entries allow specific settings for each fully qualified method name. |

To ensure the solution works correctly across multiple platforms, common specifications are required for how the information in SoapHeaders will be structured.

Request Soap Header Structure—The following shows the basic XML structure that the SoapHeader that is sent with each Request should adhere to.

<LogRequestSoapHeader>
<LoggerContextElements>
<entry name="GlobalUserId" value="some value"/>
<entry name="LocalInstanceId" value="some GUID"/>
<entry name="WebPageName" value="some page name"/>
<entry name="otherElement1" value="some value"/>
<entry name="otherElement2" value="some value"/>
</LoggerContextElements>
</LogRequestSoapHeader>

As described herein, the Request Handler takes values from the Logger Context. (UserID, GUID, WebPageName, etc.) and puts these values into the Request Headers so that they will be transported and available to the called Service.

The SoapHeader structure can be built by adding an entry into a LoggerContextElements node for each entry that is contained in the Logger Context class.

Response Soap Header Structure—The following shows the basic XML structure that the SoapHeader that is sent with each Request should adhere to.

<LogResponseSoapHeader>
<ExecutionDurationInSeconds>someNumber</ExecutionDurationInSeconds>
</LogResponseSoapHeader>

The disclosed embodiments distinguish over other solutions in many ways. Other typical solutions do not support automatic real-time correlation of logs, across all layers and services, as the logs are produced, as various disclosed embodiments can. Other typical solutions do not automatically include attributes in all logs as they are produced, no matter which layer or service produces the logs, such as unique identifiers, the end users ID, and which web page the user was running, as various disclosed embodiments can. Other typical solutions do not include network latency as a performance measure, as various disclosed embodiments can. Other typical solutions do not allow an application to capture the internal response time of a service to which it makes calls, as various disclosed embodiments can.

Most monitoring solutions are based on flat-file logs produced by application containers such as logs produced by web servers. This allows reports to be run periodically that can show usage statistics including response times for pages. This type of solution does not support real-time alerting as it is using after-the-fact data to produce the reports. It also does not help to determine the root cause of any slow response times.

Monitoring in conventional systems is usually done at the machine and networking device levels—not for an application as a whole which may be spread across numerous machines and devices and which may also call other services, as various disclosed embodiments can. Real-time performance monitoring by other known solutions is typically performed on a single web-site or web-service. Some solutions produce alerts when the site or service are unavailable, and some when overall slow response times are encountered; however, the best that these can generally do is report that a page or web service ran slow. While these conventional reports are better than nothing, they do not provide information such as whether calls to another service and/or network latency are actually responsible for the slow response times.

Known solutions generally monitor the front-end overall response of a web application or web service, and do not monitor outgoing calls to other web services made by the application being monitored, as various disclosed embodiments can.

A different system and method for service response monitoring is described in commonly-assigned, copending U.S. patent application Ser. No. 10/947,858, which is hereby incorporated by reference.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and other known media.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for service call data logging, comprising:
   intercepting a call to a data processing service;
   generating first log data corresponding to the call in response to said intercepting and before the call is received by the data processing service, wherein generating the first log data includes calling an Application Monitor function;
   transmitting a request message to the data processing service, the request message including the first log data and the call;
   intercepting a response message corresponding to the request message, the response message including a service response to the call and second log data corresponding to the first log data and including log information corresponding to processing of the call;
   generating third log data corresponding to the first log data and the second log data; and
   storing the third log data.

2. The method of claim 1, wherein the call to a data processing service is made by a first data processing service, and further comprising delivering the service response to the first data processing service.

3. The method of claim 1, wherein the second log data includes information corresponding to a network latency of transmitting the request message.

4. The method of claim 1, wherein the second log data includes information corresponding to the processing time of the data processing service.

5. The method of claim 1, wherein generating the third log data includes calling an Application Monitor function.

6. A method for service call data logging, comprising:
   intercepting a request message for a data processing service, the request message including first log data and a call to the data processing service;
   generating second log data corresponding to the first log data in response to said intercepting a request message and before the call is received by the data processing service, wherein generating the second log data includes calling an Application Monitor function;
   delivering the call to the data processing service;
   intercepting a service response corresponding to the call from the data processing service;
   generating third log data corresponding to the second log data and including log information corresponding to processing of the call;
   transmitting a response message corresponding to the request message, the response message including the service response and the third log data; and
   storing the third log data.

7. The method of claim 6, wherein the call request message for a data processing service is made by a first data processing service.

8. The method of claim 6, wherein the second log data includes information corresponding to a network latency of the intercepted request message.

9. The method of claim 6, wherein the third log data includes information corresponding to the time of transmitting the response message.

10. The method of claim 6, wherein generating the third log data includes calling an Application Monitor function.

11. A method for service call data logging, comprising:
   intercepting a call from a first data processing service to a second data processing service;
   generating first log data corresponding to the intercepted call;
   transmitting a request message to the second data processing service, the request message including the first log data and the intercepted call;
   intercepting the request message;
   generating second log data corresponding to the request message;

delivering the call to the second data processing service;
intercepting a service response corresponding to the call from the second data processing service;
generating third log data corresponding to the second log data and including log information corresponding to processing of the call;
transmitting a response message to the first data processing service corresponding to the request message, the response message including the service response and the third log data;
storing the third log data; and
intercepting the response message, and generating a fourth log data corresponding to the response message and a network latency.

12. The method of claim 11, further comprising delivering the service response to the first data processing service.

13. The method of claim 11, wherein the second log data includes information corresponding to a network latency of the transmitting the request message to the second data processing service.

* * * * *